United States Patent
Kato (10) Patent No.: US 12,500,264 B2
(45) Date of Patent: Dec. 16, 2025

(54) SOLID-STATE BATTERY AND METHOD FOR PRODUCING SOLID-STATE BATTERY

(71) Applicant: TOYOTA JIDOSHA KABUSHIKI KAISHA, Toyota (JP)

(72) Inventor: Ryoichi Kato, Tokai (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 620 days.

(21) Appl. No.: 17/948,525

(22) Filed: Sep. 20, 2022

(65) Prior Publication Data

US 2023/0106063 A1 Apr. 6, 2023

(30) Foreign Application Priority Data

Sep. 28, 2021 (JP) ................. 2021-157682

(51) Int. Cl.
 *H01M 10/0562* (2010.01)
 *H01M 10/0525* (2010.01)
(52) U.S. Cl.
 CPC ... *H01M 10/0562* (2013.01); *H01M 10/0525* (2013.01)
(58) Field of Classification Search
 CPC ......... H01M 10/0562; H01M 10/0525; H01M 2300/0068; Y02E 60/10; Y02P 70/50
 See application file for complete search history.

(56) References Cited

U.S. PATENT DOCUMENTS

2017/0338522 A1* 11/2017 Hu ................. H01M 4/381
2019/0334201 A1 10/2019 Senoue

FOREIGN PATENT DOCUMENTS

| JP | 2019-192563 A | 10/2019 |
|---|---|---|
| JP | 2021-039876 A | 3/2021 |

* cited by examiner

*Primary Examiner* — Aiqun Li
(74) *Attorney, Agent, or Firm* — Oliff PLC (57) ABSTRACT

A solid-state battery in which a decrease in the capacity retention rate is suppressed, and a method for producing the solid-state battery are provided. A solid-state battery comprising an anode layer, a cathode layer and a solid electrolyte layer, wherein the anode layer contains an interface forming agent, and the interface forming agent contains at least one kind of elements selected from metal elements and semi-metal elements, which can become cations which conduct the solid electrolyte contained in the solid electrolyte layer, which are not involved in an electrode reaction, which have lower ionic conductivity than ions involved in the electrode reaction, and which have ionic radii of 1.34 Å or less, and wherein the solid electrolyte layer has dendritic structure in at least one of an interface with the cathode layer and an interface with the anode layer.

12 Claims, 2 Drawing Sheets

SOLID-STATE BATTERY AND METHOD FOR PRODUCING SOLID-STATE BATTERY

TECHNICAL FIELD

The disclosure relates to a solid-state battery and a method for producing the solid-state battery.

BACKGROUND

Recently, with the rapid spread of information-related devices and communication devices such as personal computers, video cameras and mobile phones, the development of batteries for use as the power source of the devices, is increasingly important. Also in the automotive industry, etc., the development of a high-power and high-capacity battery for battery electric vehicles or hybrid electric vehicles has been promoted.

Among batteries, a lithium secondary battery has attracted attention for the following reason: since lithium, which has the largest ionization tendency among metals, is used as the anode, a potential difference from the cathode is large, and a high output voltage is obtained.

Also, a solid-state battery has attracted attention in that a solid electrolyte is used as the electrolyte interposed between the cathode and the anode, instead of an electrolytic solution containing an organic solvent.

Patent Literature 1 discloses an all-solid-state battery in which a side peripheral surface of a cathode layer is covered with an insulating layer. Patent Literature 1 teaches that a short circuit can be suppressed by providing such an insulating layer, and that the solid electrolyte layer can be more hardly peeled off from the insulating layer since fine concavo-convex are formed on the surface of the insulating layer by containing an insulating filler in the insulating layer.

Patent Literature 2 discloses an all-solid-state battery including a solid electrolyte layer containing hollow particles. Patent Literature 2 teaches that when an expansion stress occurs in the horizontal direction of the electrode body due to expansion of the active material at the time of initial charge, the expansion stress can be buffered by yield and collapse of the hollow particles, thereby preventing serious gaps or cracks that affect the battery performance from occurring in the solid electrolyte layer.

Patent Literature 1: Japanese Patent Application Laid-Open (JP-A) No. 2021-039876

Patent Literature 2: JP-A No. 2019-192563

However, as one of the problems of the conventional solid-state batteries, there is a problem that an interface between the solid electrolyte layer and the anode layer or the cathode layer is peeled off due to expansion and contraction of the active material at the time of charge and discharge, and as a result, the capacity retention rate is lowered. It is difficult to sufficiently suppress peeling of the interface between the solid electrolyte layer and the anode layer or the cathode layer after charge and discharge even when a technique of forming a concavo-convex at an interface by containing a filler as described in Patent Literature 1 or a technique of buffering expansion stress by hollow particles as described in Patent Literature 2 is used. In a solid-state battery using a Si-based or Sn-based anode active material having a relatively large degree of expansion and contraction at the time of charge and discharge, since peeling of the interface between the solid electrolyte layer and the anode layer or the cathode layer after charge and discharge is particularly apt to occur, and as a result, the capacity retention rate is also apt to be lowered.

SUMMARY

The disclosed embodiments have been made in view of the above circumstances. A main object of the disclosed embodiments is to provide a solid-state battery in which a decrease in the capacity retention rate is suppressed, and a method for producing the solid-state battery.

The solid-state battery of the disclosed embodiments is a solid-state battery comprising an anode layer containing an anode active material, a cathode layer containing a cathode active material, and a solid electrolyte layer containing a solid electrolyte and being disposed between the anode layer and the cathode layer, wherein the anode layer further contains an interface forming agent, and the interface forming agent contains at least one kind of elements selected from metal elements and semi-metal elements, which can become cations which conduct the solid electrolyte contained in the solid electrolyte layer, which are not involved in an electrode reaction, which have lower ionic conductivity than ions involved in the electrode reaction, and which have ionic radii of 1.34 Å or less, and wherein the solid electrolyte layer has dendritic structure in at least one of an interface with the cathode layer and an interface with the anode layer.

In the solid-state battery of the disclosed embodiments, the solid electrolyte contained in the solid electrolyte layer may be a sulfide-based solid electrolyte.

In the solid-state battery of the disclosed embodiments, the interface forming agent may contain at least one kind of elements selected from the group consisting of Ca, Al, Mg, Na and B as the metal elements or the semi-metal elements.

In the solid-state battery of the disclosed embodiments, the interface forming agent may be an amorphous glass material containing an oxide of the metal elements or semi-metal elements.

In the solid-state battery of the disclosed embodiments, a content of the interface forming agent may be 1 part by mass or more and 5 parts by mass or less per 100 parts by mass of the anode active material.

In the solid-state battery of the disclosed embodiments, the anode layer may contain, as the anode active material, an active material containing Si or Sn as a constituent element.

The method of the disclosed embodiments for producing a solid-state battery is a method for producing a solid-state battery comprising an anode layer containing an anode active material, a cathode layer containing a cathode active material, and a solid electrolyte layer containing a solid electrolyte and being disposed between the anode layer and the cathode layer, the method comprising:

forming the solid electrolyte layer having flat surfaces, forming the anode layer on one surface of the solid electrolyte layer, and forming the cathode layer on the other surface of the solid electrolyte layer, wherein the anode layer further contains an interface forming agent, and the interface forming agent contains at least one kind of elements selected from metal elements and semi-metal elements, which can become cations which conduct the solid electrolyte contained in the solid electrolyte layer, which are not involved in an electrode reaction, which have lower ionic conductivity than ions involved in the electrode reaction, and which have ionic radii of 1.34 Å or less, and wherein the method further comprises making at least one of an interface of the solid electrolyte layer with the cathode layer and an interface of the solid electrolyte layer with the anode layer into an interface having dendritic structure, by charging and discharging a stack including the anode layer, the solid electrolyte layer and the cathode layer in this order for one or more cycles at a current value of 0.364 mAh or less and in a voltage range where neither decomposition of the cathode active material nor metal precipitation on the anode active material occur.

According to the disclosed embodiments, a solid-state battery in which a decrease in the capacity retention rate is suppressed can be provided.

BRIEF DESCRIPTION OF THE DRAWINGS

In the accompanying drawings.

DETAILED DESCRIPTION

In the disclosed embodiments, the term "A to B" in the numerical range means that the numerical value described as A is included as the lower limit value and the numerical value described as B is included as the upper limit value.
1. Solid-State Battery The solid-state battery of the disclosed embodiments is a solid-state battery comprising an anode layer containing an anode active material, a cathode layer containing a cathode active material, and a solid electrolyte layer containing a solid electrolyte and being disposed between the anode layer and the cathode layer,
  wherein the anode layer further contains an interface forming agent, and the interface forming agent contains at least one kind of elements selected from metal elements and semi-metal elements, which can become cations which conduct the solid electrolyte contained in the solid electrolyte layer, which are not involved in an electrode reaction, which have lower ionic conductivity than ions involved in the electrode reaction, and which have ionic radii of 1.34 Å or less, and
  wherein the solid electrolyte layer has dendritic structure in at least one of an interface with the cathode layer and an interface with the anode layer.

Figure 1:
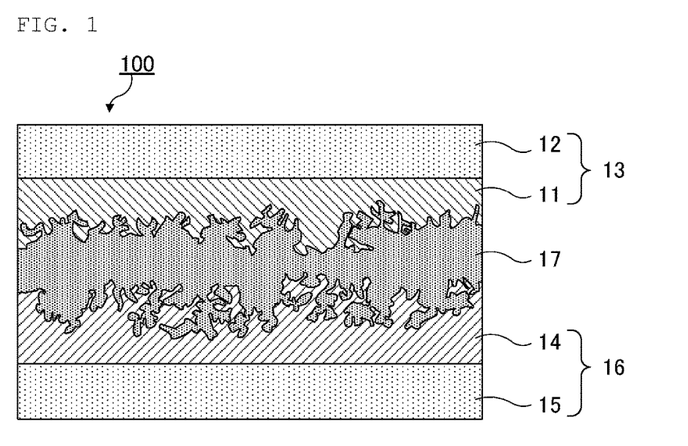
FIG. 1 is a schematic cross-sectional view of an example of the solid-state battery of the disclosed embodiments.

FIG. 1 is a schematic cross-sectional view of an example of the solid-state battery of the disclosed embodiments. As shown in FIG. 1, the solid-state battery 100 includes an anode layer 13 including an anode active material layer 11 and an anode current collector 12, a cathode layer 16 including a cathode active material layer 14 and a cathode current collector 15, and a solid electrolyte layer 17 disposed between the anode layer 13 and the cathode layer 16. The solid electrolyte layer 17 has dendritic structure at both the interface with the anode layer 13 and the interface with the cathode layer 16.

In conventional solid-state batteries, there has been a problem that when expansion and contraction of the active material occur at the time of charge and discharge or the like, the interface between the solid electrolyte layer and the anode layer or the cathode layer was peeled off, and the capacity retention rate was lowered. In contrast, in the solid-state battery of the disclosed embodiments, at least one of the interface between the solid-state electrolyte layer and the cathode layer and the interface between the solid-state electrolyte layer and the anode layer is an interface having dendritic structure, and the interface having the dendritic structure exhibits a high anchor effect; therefore, even if expansion and contraction of the active material occur, the interface is hardly peeled off, and a decrease in the capacity retention rate due to the interface peeling is suppressed.

In the disclosed embodiments, an interface having dendritic structure may be simply referred to as a "dendritic interface".

Conventional solid-state batteries often have flat solid electrolyte layer interfaces. On the other hand, in the solid-state battery of the disclosed embodiments, at least one of the interface between the solid electrolyte layer and the cathode layer and the interface between the solid electrolyte layer and the anode layer is an interface having dendritic structure because the anode layer contains an interface forming agent.

The interface forming agent used in the solid-state battery of the disclosed embodiments contains at least one kind of elements selected from metal elements and semi-metal elements, which can become cations which conduct the solid electrolyte contained in the solid electrolyte layer, which are not involved in an electrode reaction, which have lower ionic conductivity than ions involved in the electrode reaction, and which have ionic radii of 1.34 Å or less. When a low-rate charge and discharge is performed on a stack including an anode layer containing the interface forming agent, a solid electrolyte layer and a cathode layer in this order, the metal elements or semi-metal elements contained in the interface forming agent contained in the anode layer are cationized by an electrochemical reaction. Then, the generated cations conduct from the anode layer to the solid electrolyte layer, and the cations are retained in the solid electrolyte layer and held in the solid electrolyte. Since the above-mentioned cations have ionic radii of 1.34 Å or less, they can move in the battery. However, since the ionic conductivity of the cations is lower than that of ions involved in the electrode reaction, the cations do not reach the cathode layer and stay in the solid electrolyte layer. When the concentration of the above cations in the solid electrolyte layer increases, a portion having a high concentration of the above cations extends dendritically to at least one of the cathode layer side and the anode layer side. Further, the composition of the solid electrolyte changes due to the retention of the cations in the solid electrolyte, and then, an interface having dendritic structure is formed. It is considered that the dendritically extended portion at the solid electrolyte layer interface contains a solid electrolyte whose composition has been changed by the above cations, so that the interface has a higher anchor effect, and a peeling suppressing effect is exhibited.

Incidentally, lithium dendrite, which is often a problem in conventional lithium-ion batteries, is formed by precipitation of metal lithium. The dendritic interface of the solid-state battery of the disclosed embodiments can be distinguished from an interface formed by the lithium dendrite in that the dendritic structure is made of the solid electrolyte in which the composition change has been occurred due to the cations generated from an interface forming agent.

In the disclosed embodiments, ions which do not involve in an electrode reaction are ions which irreversibly react with or do not react with an active material and do not involve in electric energy taken out into an external circuit of a battery. The ions involved in an electrode reaction are ions which changes the potential of the active material by reversibly inserting and desorbing into and out of the active material, and generate energy for taking out electric energy to an external circuit of the battery. For example, in the case of a lithium ion battery, ions involved in the electrode reaction are lithium ions, and ions not involved in the electrode reaction are ions of metal elements or semi-metal elements other than lithium ions.

In the disclosed embodiments, the dendritic structure is patterned structure with branches, which are similar to branches of a tree. Examples of the dendritic structure include, but are not limited to, structure with a main trunk and a plurality of branches separated from the main trunk, structure with a plurality of main trunks extending from one place, and structure combining these. In the disclosed embodiments, the main trunk may or may not have branches extended from the main trunk.

It is sufficient that such dendritic structure can be observed when a cross section obtained by cutting the solid electrolyte layer in the thickness direction is observed at a magnification of 500 to 1000 times.

In the dendritic interface of the solid electrolyte layer, the number of main trunks extending from the solid electrolyte layer, in a region having a width of 100 μm in a cross section obtained by cutting the solid electrolyte layer in the thickness direction, is preferably 5 or more, more preferably 7 or more, and still more preferably 10 or more, while the number of main trunks is preferably 40 or less, more preferably 25 or less, and still more preferably 20 or less. In the dendritic structure in which the number of main trunks is within the above range, the effect of suppressing the peeling of the solid electrolyte layer interface is particularly excellent.

The dendritic interface of the solid electrolyte layer preferably has dendritic structure over the entire interface.

Hereinafter, a material or the like constituting an anode layer, a cathode layer, or a solid electrolyte layer, which are included in the solid-state battery of the disclosed embodiments will be described in detail.

[Anode Layer]

The anode layer included in the solid-state battery of the disclosed embodiments contains at least an anode active material and an interface forming agent. The anode layer may be a single layer or a multilayer. In the anode layer, it is preferable that a layer forming an interface with a solid electrolyte layer is a layer containing an interface forming agent.

The anode layer included in the solid-state battery of the disclosed embodiments typically includes an anode active material layer containing at least an anode active material and an interface forming agent, and an anode current collector, wherein the anode active material layer forms an interface with the solid electrolyte layer. Hereinafter, the anode layer including the anode active material layer and the anode current collector will be described in detail.

[Anode Active Material Layer]

The anode active material layer contains at least an anode active material and an interface forming agent, and further contains a solid electrolyte, a conductive material, a binder, etc. as necessary.

Examples of the anode active material include, but are not limited to, a carbon-based anode active material, an Si-based anode active material, and an Sn-based anode active material. Among them, from the viewpoint that the degree of expansion and contraction during charging and discharging is relatively large and the effect of the disclosed embodiments is effectively exhibited, an active material containing Si or Sn as a constituent element can be suitably used. From the viewpoint of high energy density, an Si-based anode active material can be more suitably used.

Examples of the Si-based anode active material include, but are not limited to, Si alone, a Si alloy, a silicon oxide, a silicon carbide and a silicon nitride. As the element other than Si contained in the Si alloy, examples include, but are not limited to, Fe, Co, Sb, Bi, Pb, Ni, Cu, Zn, Ge, In, Sn, Ti, etc.

Examples of the Sn-based anode active material include, but are not limited to, Sn alone, a Sn alloy, a tin oxide and a tin nitride. As the element other than Sn contained in the Sn alloy, examples include, but are not limited to, Fe, Co, Sb, Bi, Pb, Ni, Cu, Zn, Ge, In, Ti, Si, Mg, etc.

The form of the anode active material is not particularly limited, and may be a particulate form.

The average particle diameter (D50) of the anode active material is not particularly limited. It may be from 0.1 μm to 10 μm, or may be from 0.5 μm to 5 μm.

In the disclosed embodiments, the average particle diameter of the particles is the value of a volume-based median diameter (D50) measured by laser diffraction and scattering particle size distribution measurement, unless otherwise noted. The median diameter (D50) is a diameter when the cumulative volume of the particles reaches half (50%) of the total volume if the particles are arranged in order of particle diameter from smallest to largest. That is, a volume average diameter.

The content of the anode active material contained in the anode active material layer is not particularly limited. For example, it may be from 20% by mass to 90% by mass, or may be from 30% by mass to 60% by mass, when the total mass of the anode active material layer is set to 100% by mass.

The interface forming agent contained in the anode active material layer is an agent for making the interface of the solid electrolyte layer with the anode layer or the cathode layer into an interface having dendritic structure.

The interface forming agent contains at least one kind of elements selected from metal elements and semi-metal elements, which can become cations which conduct the solid electrolyte contained in the solid electrolyte layer, which are not involved in an electrode reaction, which have lower ionic conductivity than ions involved in the electrode reaction, and which have ionic radii of 1.34 Å or less. The mechanism of making the interface of the solid electrolyte layer with the anode layer or the cathode layer into an interface having the dendritic structure by the metal elements or the semi-metal elements contained in the interface forming agent is as described above. The interface forming agent may further contain other metal elements or semi-metal elements which are not involved in the electrode reaction or the formation of the dendritic interface.

It is sufficient that the ionic radii of the cations are 1.34 Å or less from the viewpoint of ion conductivity.

In the disclosed embodiments, the ionic radii are ionic radii of Shannon. The ionic radii of Shannon are described in, for example, Shannon et al., "Revised Effective Ionic Radii and Systematic Studies of Interatomie Distances in Halides and Chaleogenides", Acta Cryst. A32, (1976) 751.

When the anode layer or the cathode layer contains a solid electrolyte, it is preferable that the cations conduct the solid electrolyte in the anode layer or the cathode layer.

In the disclosed embodiments, it is preferable that the solid electrolyte contained in the solid electrolyte layer is a sulfide-based solid electrolyte, and that the cations of at least one kind of elements selected from the metal elements and semi-metal elements contained in the interface forming agent conduct inside the sulfide-based solid electrolyte. In this case, in the low-rate charge and discharge reaction process for forming the dendritic interface, the cations electrochemically conduct the sulfide-based solid electrolyte and stay in the sulfide-based solid electrolyte layer to cause the composition change, whereby the dendritic interface of the solid electrolyte layer can be made an interface with a higher anchoring effect. In the disclosed embodiments, in the entire solid-state battery, it is preferable that the contained solid electrolyte is a sulfide-based solid electrolyte.

In the case of a lithium ion battery, the ions involved in the electrode reaction are lithium ions. As the cations of metal elements or semi-metal elements, which conduct the sulfide-based solid electrolyte, which are not involved in the electrode reaction of a lithium ion battery, which have lower ionic conductivity than lithium ions, and which have ionic radii of 1.34 Å or less, examples include, but are not limited to, $Ca^{2+}$, $Al^{3+}$, $Mg^{2+}$, $Na^+$, $B^{3+}$, etc. Among them, $Ca^{2+}$ is preferred because it is easy to form a dendritic interface having a high anchor effect.

Hence, it is preferable that the interface forming agent used in the disclosed embodiments contains at least one kind of elements selected from the group consisting of Ca, Al, Mg, Na and B as the metal elements or semi-metal elements which can involve in the formation of the dendritic interface. Among them, the interface forming agent preferably contains metal elements which can involve in the formation of the dendritic interface, more preferably contains at least one kind of elements selected from Ca and Al, and particularly preferably contains at least Ca elements.

In the interface forming agent, it is preferable that the metal elements or semi-metal elements which can involve in the formation of the dendritic interface are contained in an oxide state. Specifically, it is preferable that the interface forming agent contains an oxide of at least one kind of elements selected from the group consisting of Ca, Al, Mg, Na, and B. Among these, the interface forming agent preferably contains a metallic oxide that can involve in the formation of a dendritic interface, more preferably contains at least one selected from CaO and $Al_2O_3$, and particularly preferably contains at least CaO.

In addition, from the viewpoint of easily forming a dendritic interface having a high anchor effect, the interface forming agent is preferably a glass material, and more preferably an amorphous glass material such as a glass powder or glass fiber. Further, as the interface forming agent, it is desirable to use glass having a relatively large surface area such as crushed glass.

For example, the interface forming agent used in the disclosed embodiments may be a glass material which contains at least Ca, preferably contains CaO, and may further contain elements of, for example, Al, Mg, Na, B, and the like.

The form of the interface forming agent is not particularly limited, and may be, for example, a particulate form or a fibrous form. The average particle diameter (D50) of the particulate interface forming agent is not particularly limited. It is preferably from 1 µm to 20 µm, and more preferably from 5 µm to 15 µm, from the point that the specific surface area thereof is apt to be moderate and the dendritic interface is apt to be formed, and from the point that the electron conduction path is apt to be ensured.

As the interface forming agent, a commercial product of a glass material containing the above-mentioned metal elements or semi-metal elements which can involve in the formation of a dendritic interface can be used. As the commercially available product usable as the interface forming agent, examples include, but are not limited to, VCAS-140 (product name, manufactured by Vitro Minerals Inc.). VCAS-140 is an amorphous glassy calcium aluminosilicate powder, and an amorphous glass material containing CaO and $Al_2O_3$, and further containing Mg, Na and B.

The content of the interface forming agent is not particularly limited, and it is preferably 1 part by mass or more and 5 parts by mass or less per 100 parts by mass of the anode active material. When the content of the interface forming agent is equal to or more than the lower limit value, a dendritic interface having a high anchor effect is easily formed. When the content of the interface forming agent is equal to or lower than the upper limit value, an electron conduction path is easily ensured, and an increase in resistance can be suppressed.

Since the metal elements and semi-metal elements contained in the interface forming agent can be ionized and can move in the solid-state battery during the low-rate charge and discharge for forming the dendritic interface, the content of the interface forming agent is the content of the constituent components of the interface forming agent contained in the entire solid-state battery, and the content is determined from the added amount of the interface forming agent when forming the anode layer.

Some amounts of the interface forming agent remain in the anode layer in a state containing metal or semi-metal elements which can involve in the formation of the dendritic interface even after a low-rate charge and discharge for forming the dendritic interface.

Examples of the solid electrolyte which the anode active material layer may contain include the same as those of the solid electrolyte contained in the solid electrolyte layer described later. In the anode active material layer, a sulfide-based solid electrolyte is preferably used from the viewpoint that the interface between the solid electrolyte layer and the anode layer tends to have dendritic structure having a high anchor effect.

Further, the average particle diameter (D50) of the solid electrolyte used in the anode active material layer is not particularly limited. It is preferably from 0.1 µm to 1.0 µm, and more preferably from 0.3 µm to 0.8 µm, from the viewpoint of making the contact area between the active material and the solid electrolyte wider.

The content of the solid electrolyte contained in the anode active material layer is not particularly limited. For example, it may be from 20% by mass to 70% by mass, and may be from 30% by mass to 50% by mass, when the total mass of the anode active material layer is set to 100% by mass.

As the conductive material which the anode active material layer may contain, a known material can be used, such as a carbon material and metal particles. As the carbon material, examples include, but are not limited to, at least one selected from the group consisting of acetylene black, furnace black, VGCF, carbon nanotube and carbon nanofiber. Among them, at least one selected from the group consisting of VGCF, carbon nanotube and carbon nanofiber may be used, from the viewpoint of electronic conductivity. As the metal particles, examples include, but are not limited to, particles of Ni, Cu, Fe and SUS.

As the binder which the anode active material layer may contain, a known material can be used, such as acrylonitrile butadiene rubber (ABR), butadiene rubber (BR), polyvinylidene fluoride (PVDF) and styrene butadiene rubber (SBR).

[Anode Current Collector]

As the anode current collector, a known one can be used, and it is not particularly limited. The material for the anode current collector may be a material that is not alloyed with Li, and examples thereof include, but are not limited to, SUS, copper and nickel.

The form of the anode current collector is not particularly limited, and may be in various forms such as a foil form, a plate form, a mesh form, and the like.

The thickness of the anode current collector is appropriately adjusted depending on the material and form thereof, and is not particularly limited. For example, it may be in a range of from 1 μm to 50 μm, or it may be in a range of from 5 μm to 20 μm.

[Cathode Layer]

The cathode layer included in the solid-state battery of the disclosed embodiments contains at least a cathode active material. The cathode layer may be a single layer or a multilayer. The cathode layer typically includes a cathode active material layer containing a cathode active material, and a cathode current collector, and the cathode active material layer forms an interface with the solid electrolyte layer.

Hereinafter, the cathode layer including the cathode active material layer and the cathode current collector will be described in detail.

[Cathode Active Material Layer]

The cathode active material layer contains at least a cathode active material, and further contains a solid electrolyte, a conductive material, a binder, etc. as necessary.

The type of the cathode active material is not particularly limited, and any material which can be used as a cathode active material of solid-state batteries can be used. As the cathode active material, examples include, but are not limited to, lithium metal (Li), a lithium alloy, $LiCoO_2$, $LiNi_xCo_{1-x}O_2$ (0<x<1), $LiNi_{1/3}Co_{1/3}Mn_{1/3}O_2$, $LiMnO_2$, a different element-substituted Li—Mn spinel, lithium titanate, lithium metal phosphate, LiCoN, $Li_2SiO_3$, and $Li_4SiO_4$, a transition metal oxide, $TiS_2$, Si, $SiO_2$, and a lithium storage intermetallic compound.

As the different element-substituted Li—Mn spinel, examples include, but are not limited to, $LiMn_{1.5}Ni_{0.5}O_4$, $LiMn_{1.5}Al_{0.5}O_4$, $LiMn_{1.5}Mg_{0.5}O_4$, $LiMn_{1.5}Co_{0.5}O_4$, $LiMn_{1.5}Fe_{0.5}O_4$ and $LiMn_{1.5}Zn_{0.5}O_4$. As the lithium titanate, examples include, but are not limited to, $Li_4Ti_5O_{12}$. As the lithium metal phosphate, examples include, but are not limited to, $LiFePO_4$, $LiMnPO_4$, $LiCoPO_4$ and $LiNiPO_4$. As the transition metal oxide, examples include, but are not limited to, $V_2O_5$ and $MoO_3$. As the lithium storage intermetallic compound, examples include, but are not limited to, $Mg_2Sn$, $Mg_2Ge$, $Mg_2Sb$ and $Cu_3Sb$. As the lithium alloy, examples include, but are not limited to, Li—Au, Li—Mg, Li—Sn, Li—Si, Li—Al, Li—B, Li—C, Li—Ca, Li—Ga, Li—Ge, Li—As, Li—Se, Li—Ru, Li—Rh, Li—Pd, Li—Ag, Li—Cd, Li—In, Li—Sb, Li—Ir, Li—Pt, Li—Hg, Li—Pb, Li—Bi, Li—Zn, Li—Tl, Li—Te, and Li—At.

On the surface of the cathode active material, a coating layer containing a Li ion conductive oxide may be formed. The coating layer can suppress a reaction between the cathode active material and the solid electrolyte.

As the Li ion conductive oxide used for the coating layer, examples include, but are not limited to, $LiNbO_3$, $Li_4Ti_5O_{12}$, and $Li_3PO_4$. The thickness of the coating layer is, for example, 0.1 nm or more, or it may be 1 nm or more. On the other hand, the thickness of the coating layer is, for example, 100 nm or less, or it may be 20 nm or less. The coating rate of the coating layer on the surface of the cathode active material is, for example, 70% or more, and it may be 90% or more.

The form of the cathode active material is not particularly limited, and may be a particulate form.

The average particle diameter (D50) of the cathode active material is not particularly limited. For example, it may be from 1 μm to 20 μm, or may be from 5 μm to 15 μm.

The content of the cathode active material contained in the cathode active material layer is not particularly limited. For example, it may be from 50% by mass to 95% by mass, and may be from 70% by mass to 90% by mass, when the total mass of the cathode active material layer is set to 100% by mass.

Examples of the solid electrolyte which the cathode active material layer may contain include the same as those of the solid electrolyte contained in the solid electrolyte layer described later. In the cathode active material layer, a sulfide-based solid electrolyte is preferably used from the viewpoint that the interface between the solid electrolyte layer and the cathode layer tends to have dendritic structure having a high anchor effect.

Further, the average particle diameter (D50) of the solid electrolyte used in the cathode active material layer is not particularly limited. It is preferably from 0.1 μm to 1.0 μm, and more preferably from 0.3 μm to 0.8 μm, from the viewpoint of making the contact area between the active material and the solid electrolyte wider.

The content of the solid electrolyte contained in the cathode active material layer is not particularly limited. For example, it may be from 5% by mass to 70% by mass, and may be from 30% by mass to 50% by mass, when the total mass of the cathode active material layer is set to 100% by mass.

As the conductive material and the binder which the cathode active material layer may contain, examples include the same as the conductive material and the binder which the anode active material layer may contain.

[Cathode Current Collector]

As the cathode current collector, a known one can be used, and it is not particularly limited. Examples of the material for the cathode current collector include, but are not limited to, SUS, aluminum, nickel, iron, titanium and carbon.

The form and thickness of the cathode current collector are the same as those of the anode current collector described above.

[Solid Electrolyte Layer]

As the solid electrolyte layer included in the solid-state battery of the disclosed embodiments, a known solid electrolyte usable in solid-state batteries can be used as appropriate. Examples of the solid electrolyte include, but are not limited to, an oxide-based solid electrolyte and a sulfide-based solid electrolyte. Among them, a sulfide-based solid electrolyte is preferably used from the viewpoint of easily forming a dendritic interface having a high anchor effect.

As the sulfide-based solid electrolyte, examples include, but are not limited to, $Li_2S$—$P_2S_5$, $Li_2S$—$SiS_2$, $Li_2S$—$P_2S_5$—$GeS_2$, LiX—$Li_2S$—$SiS_2$, LiX—$Li_2S$—$P_2S_5$, LiX—$Li_2O$—$Li_2S$—$P_2S_5$, LiX—$Li_2S$—$P_2O_5$, LiX-$Li_3PO_4$—$P_2S_5$ and $Li_3PS_4$. The term "$Li_2S$—$P_2S_5$" means a material made from a raw material composition containing $Li_2S$ and $P_2S_5$, and the same applies to other terms. "X" of the above-described LiX indicates a halogen element. The raw material composition containing LiX may contain one or two or more kinds of LiX. When two or more kinds of LiX are contained, the mixing ratio of the two or more kinds of LiX is not particularly limited.

As the above-mentioned LiX—Li$_2$S—SiS$_2$, LiX—Li$_2$S—P$_2$S$_5$, LiX—Li$_2$O—Li$_2$S—P$_2$S$_5$, LiX—Li$_2$S—P$_2$O$_5$ or LiX—Li$_3$PO$_4$—P$_2$S$_5$, examples include, but are not limited to, LiI—Li$_2$S—SiS$_2$, LiI—Li$_2$S—P$_2$S$_5$, LiBr—LiI—Li$_2$S—P$_2$S$_5$, LiI—Li$_2$O—Li$_2$S—P$_2$S$_5$, LiI—Li$_2$S—P$_2$O$_5$, LiI—Li$_3$PO$_4$—P$_2$S$_5$, etc. More specifically, the examples include, but are not limited to, 15LiBr·10LiI·75(0.75Li$_2$S·0.25P$_2$S$_5$), 70(0.06Li$_2$O·0.69Li$_2$S·0.25P$_2$S$_5$)·30LiI, and the like.

As the oxide-based solid electrolyte, examples include, but are not limited to, a substance having a garnet-type crystal structure containing, for example, a Li element, a La element, an A element (A is at least one of Zr, Nb, Ta and Al), and an O element. The oxide-based solid electrolyte may be Li$_{3+x}$PO$_{4-x}$N$_x$ (1≤x≤3), or the like.

The solid electrolyte may be any of solid electrolyte crystals, amorphous solid electrolytes, or solid electrolyte glass ceramics.

The form of the solid electrolyte is not particularly limited, and examples thereof include, but are not limited to, a particulate form and a plate form. The solid electrolyte may be in a particulate form from the viewpoint of handling property.

The average particle diameter (D50) of the solid electrolyte is not particularly limited. It is preferably from 1.0 μm to 3.0 μm, and more preferably from 1.5 μm to 2.5 μm, from the viewpoint of ionic conductivity.

The solid electrolytes may be used alone or two or more kinds. When two or more kinds of solid electrolytes are used, two or more kinds of solid electrolytes may be mixed and used.

The content of the solid electrolyte contained in the solid electrolyte layer is not particularly limited. It is generally 50% by mass or more, preferably 70% by mass or more, and more preferably 90% by mass or more, when the total mass of the solid electrolyte layer is set to 100% by mass. The solid electrolyte layer may be a layer made of a solid electrolyte, or the solid electrolyte layer may further contain a material different from the solid electrolyte. For example, the solid electrolyte layer may further contain a binder to gain plasticity or the like. When the solid electrolyte layer contains a material different from the solid electrolyte, the content of the solid electrolyte may be, for example, 99.8% by mass or less, or may be 99.6% by mass or less.

As the binder which the solid electrolyte layer may contain, examples include the same as the binder which the anode active material layer may contain.

When the solid electrolyte layer contains the binder, the content of the binder is not particularly limited, and may be 0.2% by mass or more, or may be 0.4% by mass or more, when the total mass of the solid electrolyte layer is set to 100% by mass. In order to facilitate high output, from the viewpoint of preventing excessive aggregation of the solid electrolyte and enabling formation of the solid electrolyte layer having a uniformly dispersed solid electrolyte, the content of the binder contained in the solid electrolyte layer is preferably 5% by mass or less.

The solid-state battery may further include an outer casing, as needed.

The material for the outer casing is not particularly limited, as long as it is stable against an electrolyte. Examples of the material include, but are not limited to, a resin such as polypropylene, polyethylene and acrylic resin.

The solid-state battery of the disclosed embodiments may be a primary battery or a secondary battery. A secondary battery is a battery which can be repeatedly charged and discharged, and it is useful as an in-vehicle battery, for example. The solid-state battery of the disclosed embodiments may be a solid-state lithium secondary battery.

As the form of the solid-state battery of the disclosed embodiments, examples include, but are not limited to, a coin form, a laminate form, a cylindrical form and a square form.

2. Method for Producing Solid-State Battery

The method for producing the above-mentioned solid-state battery of the disclosed embodiments is not particularly limited. Examples of the method include, but are not limited to, a method comprising:

forming the solid electrolyte layer having flat surfaces,
forming the anode layer on one surface of the solid electrolyte layer, and
forming the cathode layer on the other surface of the solid electrolyte layer,
wherein the anode layer further contains an interface forming agent, and the interface forming agent contains at least one kind of elements selected from metal elements and semi-metal elements, which can become cations which conduct the solid electrolyte contained in the solid electrolyte layer, which are not involved in an electrode reaction, which have lower ionic conductivity than ions involved in the electrode reaction, and which have ionic radii of 1.34 Å or less, and
wherein the method further comprises making at least one of the interface of the solid electrolyte layer with the cathode layer and the interface of the solid electrolyte layer with the anode layer into an interface having dendritic structure, by charging and discharging a stack including the anode layer, the solid electrolyte layer and the cathode layer in this order for one or more cycles at a current value of 0.364 mAh or less and in a voltage range where neither decomposition of the cathode active material nor metal precipitation on the anode active material occur.

As the method for forming the solid electrolyte layer having flat surfaces, the anode layer and the cathode layer, a conventionally known method can be used, and the method is not particularly limited. Examples of the method for forming each of the layers include, but are not limited to, a method for forming the layer by pressure molding a powder of materials constituting the layer, and a method for forming the layer by dispersing materials constituting the layer in a solvent to prepare a slurry, applying the slurry on a support, and then drying the slurry.

It is sufficient that the solid electrolyte layer having flat surfaces is a solid electrolyte layer having no dendritic structure on its surfaces. The solid electrolyte layer having flat surfaces may have fine concavo-convex on its surfaces, in which the fine concavo-convex is different from the dendritic structure. For example, when a cross section obtained by cutting the solid electrolyte layer in the thickness direction is observed at a magnification of 1000, if dendritic structure cannot be confirmed at the interface of the solid electrolyte layer, the interface is assumed to be flat.

The anode layer formed on one surface of the solid electrolyte layer is preferably formed such that the layer containing the interface forming agent is in contact with the solid electrolyte layer. The cathode layer formed on the other surface of the solid electrolyte layer is preferably formed such that the layer containing the cathode active material is in contact with the solid electrolyte layer. Hence, when the anode layer includes the anode active material layer and the anode current collector, it is preferable to form the anode layer on one surface of the solid electrolyte layer such that the anode active material layer is in contact with the solid electrolyte layer. When the cathode layer includes the cathode active material layer and the cathode current collector, it is preferable to form the cathode layer on the other surface of the solid electrolyte layer such that the cathode active material layer is in contact with the solid electrolyte layer.

When the anode layer includes an anode active material layer and an anode current collector, or when the cathode layer includes a cathode active material layer and a cathode current collector, a structure including a current collector and an active material layer formed on the current collector may be prepared in advance. By using such a structure, for example, by the following method, it is possible to obtain a stack including an anode layer, a solid electrolyte layer having flat surfaces, and a cathode layer in this order.

First, a cathode structure in which a cathode active material layer is formed on a cathode current collector, and an anode structure in which an anode active material layer is formed on an anode current collector are manufactured, while a solid electrolyte layer is formed on a support. Then, the cathode structure is put on the solid electrolyte layer formed on the support such that the solid electrolyte layer and the cathode active material layer come into contact with each other. Thereafter, the solid electrolyte layer is transferred onto the cathode active material layer by peeling the support from the solid electrolyte layer. Then, the anode structure is put on the solid electrolyte layer such that the anode active material layer and the solid electrolyte layer exposed by peeling off the support come into contact with each other. Consequently, a stack including the anode current collector, the anode active material layer, the solid electrolyte layer having flat surfaces, the cathode active material layer, and the cathode current collector in this order can be manufactured.

By charging and discharging the above-mentioned stack for one or more cycles at a current value of 0.364 mAh or less and in a voltage range where neither decomposition of the cathode active material nor metal precipitation on the anode active material occur, at least one of the interface of the solid electrolyte layer with the cathode layer and the interface of the solid electrolyte layer with the anode layer can be made into an interface having dendritic structure.

The mechanism of making at least one of the interface between the solid electrolyte layer and the anode layer and the interface between the solid electrolyte layer and the cathode layer into an interface having the dendritic structure by a low-rate charge and discharge of the stack at a current value of 0.364 mAh or less is as described above.

In the above-mentioned low-rate charge and discharge, the voltage range where neither decomposition of the cathode active material nor precipitation of metal on the anode active material occur is appropriately adjusted depending on the type of the cathode active material and anode active material. The voltage range is not particularly limited, and may be within a range of, for example, from 2 V to 5 V. It is sufficient that the current value is 0.364 mAh or less. The current value is preferably 0.300 mAh or more in view of easy formation of a dendritic interface having a high anchor effect.

It is sufficient that the low-rate charge and discharge is performed for one or more cycles. From the viewpoint that a dendritic interface having a high anchor effect is easily formed, the low-rate charge and discharge is performed preferably for 2 cycles to 5 cycles, and more preferably for 2 cycles to 3 cycles.

EXAMPLES

Example 1

(1) Production of Cathode Structure $LiNi_{1/3}Co_{1/3}Mn_{1/3}O_2$ (average particle diameter: 10 μm) subjected to $LiNbO_3$ coating in a tumbling fluidized bed granulating-coating machine was used as the cathode active material. $10LiI·15LiBr·75(0.75Li_2S·0.25P_2S_5)$ (mol %, average particle diameter: 0.5 μm) was used as the sulfide-based solid electrolyte. VGCF-H was used as the conductive material. PVDF was used as the binder. These materials were weighed to the following weight ratios.

Cathode active material:Sulfide-based solid electrolyte: Conductive material:Binder=85.4:12.7:1.3:0.6

Then, the above materials were mixed with a dispersing medium (diisobutyl ketone). The obtained mixture was dispersed by an ultrasonic homogenizer (model: UH-50, manufactured by SMT Co., Ltd.) to obtain a cathode slurry. The obtained cathode slurry was coated on an Al foil (thickness: 15 μm) as a cathode current collector by a blade coating method using an applicator, and dried at 100° C. for 30 minutes to form a cathode active material layer on the cathode current collector. Then, the obtained stack of the cathode active material layer and the cathode current collector was punched to a 1 $cm^2$ size to obtain a cathode structure including the cathode active material layer and the cathode current collector.

(2) Production of Anode Structure

Silicon particles (average particle diameter: 0.8 μm) was used as the anode active material. $10LiI·15LiBr·75(0.75Li_2S$ $0.25P_2S_5)$ (mol %, average particle diameter: 0.5 μm) was used as the sulfide-based solid electrolyte. VGCF-H was used as the conductive material. SBR was used as the binder. VCAS-140 (product name, manufactured by Vitro Minerals, Inc., average particle diameter (D50): 12 μm) was used as the interface forming agent. These materials were weighed to the following weight ratios.

Anode active material:Sulfide-based solid electrolyte: Conductive material:Binder:VCAS-140=46.8:44.4:6.5:1.4: 0.5

Then, the above materials were mixed with a dispersing medium (diisobutyl ketone). The obtained mixture was dispersed by a thin-film spin system high-speed mixer (FILMIX (registered trademark) model 30-L, manufactured by PRIMIX Corporation) to obtain an anode slurry. The obtained anode slurry was coated on a Ni foil (thickness: 22 μm) as an anode current collector by a blade coating method using an applicator, and dried at 100° C. for 30 minutes to form an anode active material layer on the anode current collector. Then, the obtained stack of the anode active material layer and the anode current collector was punched to a 1 $cm^2$ size to obtain an anode structure including the anode active material layer and the anode current collector. The gap of the applicator at the time of coating the anode slurry was adjusted such that the weight of the anode active material per 1 $cm^2$ satisfies the following equation when the capacity of the cathode active material was 207 mAh/g and the capacity of the anode active material was 3579 mAh/g.

Cathode capacity/Anode capacity=3

(3) Production of Solid Electrolyte Layer $10LiI·15LiBr·75(0.75Li_2S·0.25P_2S_5)$ (mol %, average particle diameter: 2.0 μm) was used as the sulfide-based solid electrolyte. SBR was used as the binder. These materials were weighed to the following weight ratio.

Sulfide-based solid electrolyte:Binder=99.6:0.4

Then, the above materials were mixed with a dispersing medium (diisobutyl ketone). The obtained mixture was dispersed by an ultrasonic homogenizer (model: UH-50, manufactured by SMT Co., Ltd.) to obtain a solid electrolyte slurry. The obtained solid electrolyte slurry was coated on an Al foil (thickness: 15 µm) by a blade coating method using an applicator, and dried at 100° C. for 30 minutes to form a solid electrolyte layer on the Al foil. Then, the obtained stack of the solid electrolyte layer and the Al foil was punched to a 1 cm$^2$ size to obtain the solid electrolyte layer with Al foil.

(4) Production of Solid-State Battery

The solid electrolyte layer with Al foil and the cathode structure were opposed to each other such that the solid electrolyte layer and the cathode active material layer were superposed on each other, and pressed at a linear pressure of 1.6 t/cm by a roll pressing method. Thereafter, the solid electrolyte layer was transferred onto the cathode active material layer by peeling the Al foil from the solid electrolyte layer. The solid electrolyte layer transferred onto the cathode active material layer and the anode structure were opposed to each other such that the solid electrolyte layer and the anode active material layer were superposed on each other, and pressed at a surface pressure of 5.0 t/cm$^2$ by using a uniaxial press machine. Thereafter, current collecting tabs were disposed on the cathode current collector and the anode current collector, and were laminated and sealed. Then, as a low-rate charging and discharging, in a 25° C. constant-temperature chamber, constant-current charging was performed at 0.364 mAh until the voltage value reached 4.05 V, followed by constant-voltage charging at 4.05 V until the current value reached 0.036 mAh. Then, constant-current discharging was performed at 0.364 mAh until the voltage value reached 2.5 V, followed by constant-voltage discharging at 2.5 V until the current value reached 0.036 mAh. The above-mentioned operations of charging and discharging were repeated three times to obtain the solid-state battery of Example 1.

Example 2

The solid-state battery of Example 2 was obtained in the same manner as in Example 1, except that each material was weighed to the following weight ratios in the above "(2) Production of anode structure".

Anode active material:Sulfide-based solid electrolyte: Conductive material:Binder:VCAS-140=45.9:43.5:6.4:1.4: 2.3

Comparative Example 1

The solid-state battery of Comparative Example 1 was obtained in the same manner as in Example 1, except that no VCAS-140 was added and each material was weighed to the following weight ratios in the above "(2) Production of anode structure".

Anode active material:Sulfide-based solid electrolyte: Conductive material:Binder=47.0:44.6:6.6:1.4

[Cross-Sectional Observation]

The cross sections of the stacking direction of the solid-state batteries obtained in Examples and Comparative Examples were subjected to SEM observation at a magnification of 1000 times.

As a result, as shown in FIG. 1, in the cross-sections of the solid-state batteries obtained in Examples, both the interface between the solid electrolyte layer and the anode layer and the interface between the solid electrolyte layer and the cathode layer had dendritic structure over the whole area of the interfaces. More specifically, in the cross section of the solid-state battery obtained in Example 1, the number of main trunks extending from the solid-state electrolyte layer at the interface between the solid-state electrolyte layer and the anode layer was 12 to 19 in the region of 100 µm in width, and the number of main trunks extending from the solid-state electrolyte layer at the interface between the solid-state electrolyte layer and the cathode layer was 7 to 17 in the region of 100 µm in width. In the cross section of the solid-state battery obtained in Example 2, the number of main trunks extending from the solid-state electrolyte layer at the interface between the solid-state electrolyte layer and the anode layer was 17 to 21 in the region of 100 µm in width, and the number of main trunks extending from the solid-state electrolyte layer at the interface between the solid-state electrolyte layer and the cathode layer was 10 to 22 in the region of 100 µm in width.

On the other hand, in the cross section of the solid-state battery obtained in Comparative Example 1, the interfaces of the solid electrolyte layer were flat.

[Ca Element Mapping]

A Ca element mapping analysis was performed on the cross-sections of the solid-state batteries obtained in Examples. As a result, it was confirmed that Ca was present in the solid electrolyte layer of the solid-state batteries obtained in Examples, and Ca was distributed in a dendritic manner at least at the interface on the anode layer side. Thus, it was clarified that Ca in the interface forming agent contained in the anode active material layer conducted the solid electrolyte layer, and moreover, Ca was transferred to form dendritic structure at the solid electrolyte layer interface.

Figure 2:
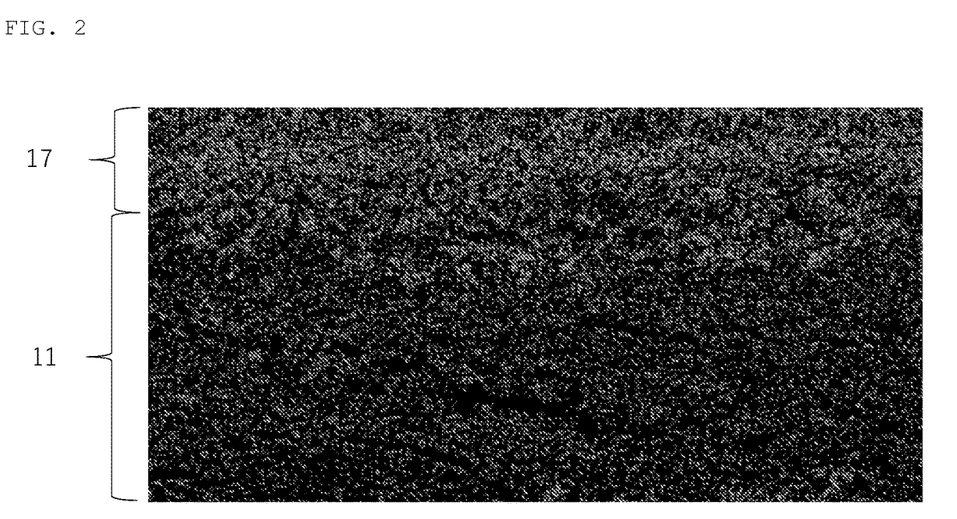
FIG. 2 is an image of Ca element mapping analysis in the cross section of the solid-state battery obtained in Example 2.

As a specific example of the image of the Ca element mapping analysis, FIG. 2 shows an image of the Ca element mapping analysis in the cross section of the solid-state battery obtained in Example 2. In the image shown in FIG. 2, a portion where Ca is detected is represented by gray. Since the detection limit of Ca was set such that the difference between the amount of Ca in the solid electrolyte layer and the amount of Ca in the anode active material layer was clear, and the image was taken in the field of view in which the interface forming agent in the anode active material layer was not reflected, it appears that Ca is hardly detected in the anode active material layer in the image shown in FIG. 2; however, Ca is contained in the anode active material layer.

[Charge and Discharge Evaluation]

The solid-state batteries obtained in Examples and Comparative Examples were subjected to the following charge and discharge, in a constant temperature bath at 60° C. First, constant-current charging at 3.64 mAh was performed until the voltage value reached 4.05 V, followed by constant-voltage charging at 4.05 V until the current value reached 1.21 mAh. Then, constant-current discharging at 3.64 mAh was performed until the current value reached 2.5 V, followed by constant-voltage discharging at 2.5 V until the current value reached 1.21 mAh. The above-mentioned operations of charging and discharging were repeated 50 times.

The discharge capacity at the time of discharge of the first cycle was determined as the initial discharge capacity. The discharge capacity at each subsequent cycle was determined as the discharge capacity after cycle test. A capacity retention rate was calculated by the following formula.

Capacity retention ratio (%)=(Discharge capacity after cycle test/Initial discharge capacity)×100

Figure 3:
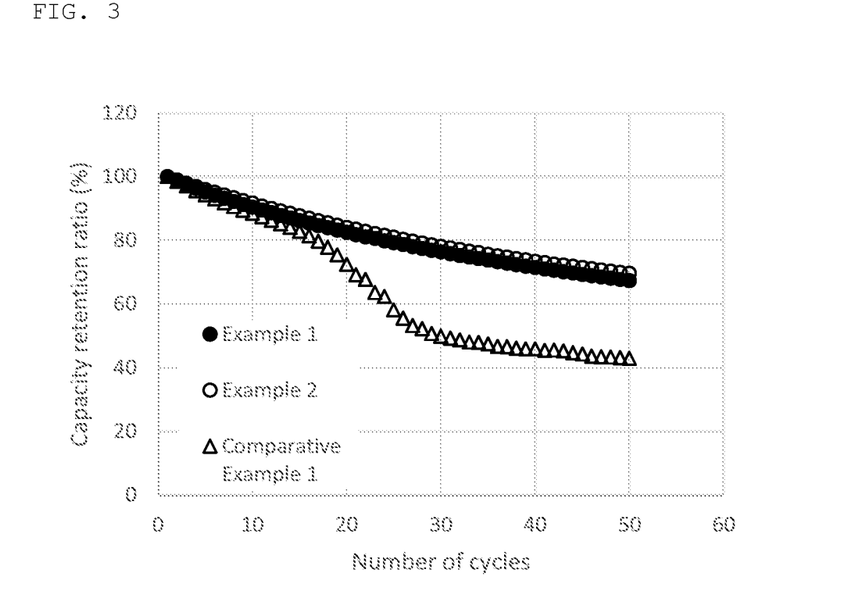
FIG. 3 is a graph showing the capacity retention rates of the solid-state batteries obtained in Examples 1 and 2 and Comparative Example 1.

The capacity retention rates of the solid-state batteries obtained in Examples and Comparative Examples are shown in FIG. 3.

[Evaluation Results]

Since the solid-state battery of Comparative Example 1 was a solid-state battery obtained without containing an interface forming agent in the anode layer, neither the interface between the solid-state electrolyte layer and the anode layer nor the interface between the solid-state electrolyte layer and the cathode layer had dendritic structure. As shown in FIG. 3, in the solid-state battery of Comparative Example 1, in the charge and discharge evaluation, the capacity retention rate began to decrease rapidly after the number of cycles 15, the capacity retention rate decreased to about 50% at the number of cycles 30, and continued to decrease thereafter, and the capacity retention rate was about 40% at the number of cycles 50. In the solid-state battery of Comparative Example 1, it was considered that the capacity retention rate was lowered as described above since peeling occurred at the solid-state electrolyte layer interface in the vicinity of the number of cycles 15.

In contrast, since the solid-state batteries obtained in Examples 1 and 2 were prepared by adding the interface forming agent to the anode layer, stacking the cathode layer, the solid-state electrolyte layer and the anode layer, and then charging and discharging the stack at the low rate, both the interface between the solid-state electrolyte layer and the cathode layer and the interface between the solid-state electrolyte layer and the anode layer had dendritic structure. As shown in FIG. 3, in the solid-state batteries of Examples 1 and 2, the capacity retention rate was about 70% even when the number of cycles was 50 in the charge and discharge evaluation, and the decrease in the capacity retention rate was suppressed. Further, in the solid-state batteries of Examples 1 and 2, the interface peeling of the solid-state electrolyte layer did not occur when the number of cycles was 50.

REFERENCE SIGNS LIST

11. Anode active material layer
12. Anode current collector
13. Anode layer
14. Cathode active material layer
15. Cathode current collector
16. Cathode layer
17. Solid electrolyte layer
100. Solid-state battery

The invention claimed is:

1. A solid-state battery comprising an anode layer containing an anode active material, a cathode layer containing a cathode active material, and a solid electrolyte layer containing a solid electrolyte and being disposed between the anode layer and the cathode layer,
wherein the anode layer further contains an interface forming agent, and the interface forming agent contains at least one kind of elements selected from the group consisting of metal elements and semi-metal elements, which can become cations which conduct the solid electrolyte contained in the solid electrolyte layer, which are not involved in an electrode reaction, which have lower ionic conductivity than ions involved in the electrode reaction, and which have ionic radii of 1.34 Å or less, and
wherein the solid electrolyte layer has dendritic structure in at least one of an interface with the cathode layer and an interface with the anode layers,
wherein the dendritic structure is (a) a main trunk with a plurality of branches separated from the main trunk, or (b) a structure with a plurality of main trunks extending from one place, or (c) a structure combining (a) and (b), and
wherein in a dendritic interface of the solid electrolyte layer, the number of main trunks extending from the solid electrolyte layer, in a region having a width of 100 μm in a cross section obtained by cutting the solid electrolyte layer in the thickness direction, is 10 or more, while the number of main trunks is 20 or less.

2. The solid-state battery according to claim 1, wherein the solid electrolyte contained in the solid electrolyte layer is a sulfide-based solid electrolyte.

3. The solid-state battery according to claim 1, wherein the interface forming agent contains at least one kind of elements selected from the group consisting of Ca, Al, Mg, Na and B as the metal elements or the semi-metal elements.

4. The solid-state battery according to claim 1, wherein the interface forming agent is an amorphous glass material containing an oxide of the metal elements or the semi-metal elements.

5. The solid-state battery according to claim 1, wherein a content of the interface forming agent is 1 part by mass or more and 5 parts by mass or less per 100 parts by mass of the anode active material.

6. The solid-state battery according to claim 1, wherein the anode layer contains, as the anode active material, an active material containing Si or Sn as a constituent element.

7. A method for producing a solid-state battery comprising an anode layer containing an anode active material, a cathode layer containing a cathode active material, and a solid electrolyte layer containing a solid electrolyte and being disposed between the anode layer and the cathode layer, the method comprising:
forming the solid electrolyte layer having flat surfaces,
forming the anode layer on one surface of the solid electrolyte layer, and
forming the cathode layer on the other surface of the solid electrolyte layer,
wherein the anode layer further contains an interface forming agent, and the interface forming agent contains at least one kind of elements selected from the group consisting of metal elements and semi-metal elements, which can become cations which conduct the solid electrolyte contained in the solid electrolyte layer, which are not involved in an electrode reaction, which have lower ionic conductivity than ions involved in the electrode reaction, and which have ionic radii of 1.34 Å or less, and
wherein the method further comprises making at least one of an interface of the solid electrolyte layer with the cathode layer and an interface of the solid electrolyte layer with the anode layer into an interface having dendritic structure, by charging and discharging a stack including the anode layer, the solid electrolyte layer and the cathode layer in this order for one or more cycles at a current value of 0.364 mAh or less and in a voltage range where neither decomposition of the cathode active material nor metal precipitation on the anode active material occur.

8. The solid-state battery according to claim 1, wherein when the metal elements or semi-metal elements contained in the interface forming agent contained in the anode layer are cationized by an electrochemical reaction, the generated cations conduct from the anode layer to the solid electrolyte layer, and the cations are retained in the solid electrolyte layer and held in the solid electrolyte and do not reach the cathode layer but stay in the solid electrolyte layer.

9. The solid-state battery according to claim 1, wherein the dendritic structure can be observed when a cross section obtained by cutting the solid electrolyte layer in the thickness direction is observed at a magnification of 500 to 1000 times.

10. The solid-state battery according to claim 1, wherein the form of the interface forming agent is a particulate form or a fibrous form.

11. The solid-state battery according to claim 10, wherein the form is particulate having an average particle diameter D50 of from 5 μm to 15 μm.

12. The solid-state battery according to claim 1, wherein the interface forming agent is an amorphous glassy calcium aluminosilicate powder, and an amorphous glass material containing CaO and $Al_2O_3$, and further containing Mg, Na and B.

* * * * *